(12) United States Patent
Ecker et al.

(10) Patent No.: US 10,095,379 B2
(45) Date of Patent: Oct. 9, 2018

(54) METHOD FOR SELECTING A LIST ELEMENT

(71) Applicant: Bayerische Motoren Werke Aktiengesellschaft, Munich (DE)

(72) Inventors: Ronald Ecker, Munich (DE); Simon Stusak, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 874 days.

(21) Appl. No.: 13/837,282

(22) Filed: Mar. 15, 2013

(65) Prior Publication Data
US 2013/0205258 A1 Aug. 8, 2013

Related U.S. Application Data

(63) Continuation of application No. PCT/EP2011/066977, filed on Sep. 29, 2011.

(30) Foreign Application Priority Data

Sep. 29, 2010 (DE) .................. 10 2010 041 584

(51) Int. Cl.
  *G06F 3/0482* (2013.01)
  *B60K 35/00* (2006.01)
  *G06F 3/0485* (2013.01)
(52) U.S. Cl.
  CPC ............ *G06F 3/0482* (2013.01); *B60K 35/00* (2013.01); *G06F 3/0485* (2013.01); *B60K 2350/102* (2013.01); *B60K 2350/106* (2013.01)
(58) Field of Classification Search
  CPC .................................................... G06F 3/0482
  (Continued)

(56) References Cited

U.S. PATENT DOCUMENTS 6,553,310 B1   4/2003 Lopke
2004/0046751 A1* 3/2004 Heimermann et al. ....... 345/184
(Continued)

OTHER PUBLICATIONS

International Preliminary Report on Patentability (PCT/IB/373) and Written Opinion (PCT/ISA/237) dated Apr. 2, 2013 (Eight (8) pages).

(Continued)

*Primary Examiner* — Tadeese Hailu
*Assistant Examiner* — Darrin Hope
(74) *Attorney, Agent, or Firm* — Crowell & Moring LLP

(57) ABSTRACT

A method for selecting a list element from a list displayable on a motor vehicle display unit. The list is displayed on a first display unit. First upwards/downwards commands are received upon actuation of an operating element by a user and, corresponding to the first upwards/downwards commands received, a first preselection region, which highlights a plurality of list elements, is moved upwards/downwards within the displayed list. A first selection command is received upon an actuation of the operating element and then a sublist, which exclusively comprises the list elements highlighted by the first preselection region is displayed on a second display unit. Second upwards/downwards commands are received and, corresponding thereto, a second preselection region, which highlights a single list element in the sublist, is moved upwards/downwards within the displayed sublist. A second selection command selects the list element highlighted by the second preselection region.

18 Claims, 2 Drawing Sheets

(58) Field of Classification Search
USPC .......................................................... 715/822
See application file for complete search history.

(56) References Cited

U.S. PATENT DOCUMENTS

| | | |
|---|---|---|
| 2004/0119683 A1 | 6/2004 | Warn et al. |
| 2006/0224945 A1 | 10/2006 | Khan et al. |
| 2006/0227066 A1 | 10/2006 | Hu et al. |
| 2006/0259210 A1 | 11/2006 | Tanaka et al. |
| 2010/0238280 A1* | 9/2010 | Ishii ................................ 348/77 |

OTHER PUBLICATIONS

Corresponding International Search Report with English Translation dated Dec. 30, 2011 (four (4) pages).

* cited by examiner

METHOD FOR SELECTING A LIST ELEMENT

CROSS REFERENCE TO RELATED APPLICATIONS

This application is a continuation of PCT International Application No. PCT/EP2011/066977, filed Sep. 29, 2011, which claims priority under 35 U.S.C. § 119 from German Patent Application No. DE 10 2010 041 584.7, filed Sep. 29, 2010, the entire disclosures of which are herein expressly incorporated by reference.

BACKGROUND AND SUMMARY OF THE INVENTION

The invention relates to a method for selecting a list element from a list which includes a multiplicity of list elements and can be displayed at least in extract form on a display unit in a motor vehicle.

Modern motor vehicles have diverse information and/or entertainment sources and diverse types of visual display possibilities.

The operating interaction of the driver of a motor vehicle with an information and/or entertainment source of the motor vehicle frequently includes the selection of a list element from a list comprising a multiplicity of list elements, for example, the selection of a telephone book listing from a telephone book, the selection of a song from a playlist or the selection of a radio station from a list of stored stations.

It is an object of the present invention to provide a simple method for selecting a list element.

This and other objects are achieved by a method for selecting a list element from a list which comprises a multiplicity of list elements and can be displayed at least in extract form on a display unit in a motor vehicle, having the steps of: providing a first visual display unit that can be viewed by the driver of the motor vehicle and a second visual display unit that can be viewed by the driver of the motor vehicle; providing operating devices which can be actuated by the driver of the motor vehicle and which at least enable the driver to generate upward/downward commands and selection commands; displaying the list on the first display unit of the motor vehicle; receiving of first upward/downward commands as a result of an actuation of the operating devices by the driver and, corresponding to the received first upward/downward commands, upward/downward movements of a first preselection region within the displayed list, which preselection region highlights several list elements of the list; receiving a first selection command as a result of an actuation of the operating devices by the driver, and subsequently displaying a sublist, which exclusively comprises the list elements highlighted by the first preselection region, on the second display unit of the motor vehicle; receiving of second upward/downward commands as a result of an actuation of the operating devices by the driver and, corresponding to the received second upward/downward commands, upward/downward movements of a second preselection region within the displayed sublist, which preselection region highlights a single list element of the sublist; and receiving of a second selection command as a result of an actuation of the operating devices by the driver and subsequently, selecting the list element highlighted by the second preselection region.

Modern motor vehicles often have several display units which simultaneously, or optionally, can be used for displaying information, particularly for the information output to the driver and/or for an operating interaction with the driver. The present invention elegantly and ergonomically utilizes the availability of such display units. The method according to the invention permits the selection of a list element, which selection causes minimal distraction for the driver and therefore, among other things, contributes to traffic safety. In addition, the method according to the invention reduces the number of operating errors and thereby—although the number of operating steps actually has a tendency to be higher than in the case of conventional list selection methods—contributes to a reduction of operating times, because correcting steps are eliminated.

According to the invention, a method for selecting a list element from a list, which comprises a multiplicity of list elements and can be displayed at least in extract form on a display unit in a motor vehicle, comprises at least the following steps, preferably precisely in the sequence indicated here.

The invention is based on the availability or the providing of at least two visual display units that can be viewed by the driver of the motor vehicle. One of the display units may, for example, by a central information display (CID), on which, for example, graphic outputs, for example, of a navigation system are also contemplated. In addition, one of the display units may, for example, be a head-up display by which information is reflected into the windshield of the motor vehicle. Likewise, one of the display units may be a display integrated in a combined instrument (or a combination instrument) of the motor vehicle, constructed, for example, in LCD/TFT technology.

The invention is also based on the availability or the providing of operating devices, which can be actuated by the driver of the motor vehicle and which at least enable the driver to generate upward/downward commands and selection commands. The operating devices may particularly include at least one operating element at the steering wheel of the motor vehicle. In particular, a rotary/pressure element may be arranged at the steering wheel of the motor vehicle, whose rotating generates upward/downward commands and whose pressing generates a selection command. The rotating will then preferably take place incrementally, i.e. in rotating steps or clicks that can be felt by the operator, in which case each rotating step or click shifts a preselection element or a preselection region by one list element, respectively, with respect to the list.

First, the list is displayed on a first display unit of the motor vehicle (for example, in the CID). When the operator then actuates the operating devices (for example, by rotating a rotary/pressure element) such that he generates upward/downward commands, these commands are received and, corresponding to the (first) received upward/downward command, a first preselection region (such as a frame) which highlights several list elements of the list, is moved upward or downward with respect to the displayed list. The movement of the preselection region with respect to or within the list can be visually exhibited, for example, by an actual movement of the preselection region on the display unit and/or by a movement of the list elements in the opposite direction.

If, in the operator's opinion, the first preselection region is appropriately positioned within the list, the operator can actuate the operating devices (for example, by pressing a rotary/pressure element, preferably the same rotary/pressure element) such that he generates a first selection command. This first selection command is received, and subsequently a sublist is displayed on a second display unit of the motor vehicle (for example, by the head-up display), which sublist exclusively comprises the list elements previously highlighted by the first preselection region.

Up to this point, the operator in a sense has reduced the original list and shifted it from the first to the second display unit. He can now interact again with the reduced sublist. When the operator then actuates the operating devices (for example, by rotating the rotary/pressure element, preferably the same rotary/pressure element) such that he generates further upward/downward commands, these will be received, and, corresponding to the received (second) upward/downward commands, a second preselection region (for example, a frame), which this time highlights only a single list element of the sublist, is moved upward or downward with respect to or within the displayed sublist.

When, in the operator's opinion, the second preselection region is appropriately positioned within the sublist; i.e. when he marks the desired list element, the operator can actuate the operating devices (for example, by pressing a rotary/pressure element, preferably the same rotary/pressure element) such that he generates a second selection command. This second selection command is received, and subsequently, the list element is selected which is highlighted by the second preselection region.

The method according to the invention is constructed in two steps. In a first step, a first operating sub-dialog is carried with a first display unit; in a second step, a second operating sub-dialog concerning only a sublist is carried out with a second, other display unit. Because of the reduction of the operating dialog to a sublist, the demands on the effective display surface of the second display unit are clearly lower than those made on the first display unit. A second display unit, (such as a head-up display), can therefore be used, which is situated in the, or at least close to, the direct line of view of the driver concentrating on the driving task—even if this second display unit offers only limited display possibilities. The driver's attention is therefore diverted only slightly from the driving task by the second operating sub-dialog. However, in addition, in the case of the invention, the distraction from the driving task already caused by the first operating sub-dialog is clearly reduced compared with a conventional list selection. Finally, the driver does not yet have to precisely "hit" the finally desired list element in the first operating sub-dialog, but it is sufficient for him to define the sublist such that the finally desired list element is contained therein. As a rule, the first operating sub-dialog can therefore also be carried out without errors with only a brief and/or peripheral look at the first display unit.

According to a preferred embodiment of the present invention, the first preselection region is visualized for the driver or operator by a frame around the highlighted list elements and/or by a color change of the highlighted list elements on the first display unit.

The second preselection region also can be visualized for the driver by a frame around the highlighted list element and/or by a color change of the highlighted list element on the second display unit.

As already outlined above, a preferred embodiment of the present invention provides that the first display unit is constructed as a central information display of the motor vehicle or is integrated in the instrument cluster of the motor vehicle, and that the second display unit is constructed as a head-up display of the motor vehicle.

In certain application cases, it was found to be advantageous for the display of list elements by the second display unit to be triggered only by the first selection command or by its reception. As far as time is concerned, the second display unit is therefore available before the reception of the first selection command for other display contents or remains without any display in order to minimize driver distraction.

It is further advantageous for the display of list elements to automatically be terminated again by the control unit after the expiration of a predefined time period after the second selection command. The previously displayed display contents can then be made available again, or the second display unit will then again remain without a display in order to minimize driver distraction.

According to an alternative embodiment of the invention, already before the reception of the first selection command in step with the movement of the first preselection region, those list elements are displayed on the second display unit which are highlighted on the first display unit by the first preselection region. The operator therefore has the choice of whether, before the issuing of the first selection command, he orients himself according to the list extract presented on the second display unit or according to the more comprehensive display on the first control unit. When the operator orients himself according to the list extract presented on the second display unit, the above-mentioned first operating sub-dialog is displayed to him as a pure change of the list extract. Only after the issuing of the first selection command and the transition connected therewith to the second operating sub-dialog, a preselection region, specifically the second preselection region, will appear on the second display unit.

It is also advantageous for the display of list elements by the first display unit to be triggered only as a result of the first upward/downward commands. With respect to time, the first display unit will therefore be available before the reception of the first upward/downward commands for other display contents or will remain without any display in order to minimize driver distraction. This type of configuration of the process will be particularly advantageous if the first display unit is integrated in the instrument cluster of the motor vehicle.

It is also advantageous for the display of the list elements by the first display unit to be automatically terminated again after the expiration of a predefined time period after the first selection command or after the second selection command. The previously displayed display contents can then be made available again or the first display unit remains again without any display in order to minimize driver distraction. Also this type of configuration of the process will be advantageous, particularly if the first display unit is integrated in the instrument cluster of the motor vehicle.

The first upward/downward commands are preferably generated by the same operating elements of the operating devices and by the same actuating method of these operating devices as the second upward/downward commands. The entire operating dialog is then displayed to the operator in a particularly uniform manner, can be easily implemented (practically, the first and second upward/downward commands do not have to differ), can be carried out swiftly, particularly without any "reaching around" by the operator.

The first selection command is preferably also generated by the same operating element of the operating devices and by the same actuating method of the operating element as the second selection command. The entire operating dialog is then displayed to the operator in an even more uniform manner, can be easily implemented (practically, the first and the second selection command do not have to differ), can be carried out swiftly, particularly without any "reaching around" by the operator.

According to a particularly preferred embodiment of the invention, the operating devices comprise a pressure/rotary element, the first upward/downward commands as well as the second upward/downward commands are generated by the rotation of the pressure/rotary element, and the first selection command as well as the second selection command are generated by pressing the pressure/rotary element.

In this case, the pressure/rotary element may particularly be constructed as a roller that can be rotated and pressed or as a thumbwheel that can be rotated and pressed and may be arranged at the steering wheel of the motor vehicle, specifically at a spoke of the steering wheel. Such a roller (or thumbwheel) in the following, the word "roller" will be used) preferably has an essentially cylindrical construction, in which case, the roller can be rotated about the rotational axis of symmetry of the cylinder and can be pressed perpendicularly with respect to this axis of rotation. The roller can preferably be rotated in noticeable rotating steps or "clicks", and each rotating step or "click" of the roller in the upward/downward direction generates an upward/downward command. Each pressing preferably generates one selection command. The roller is preferably inserted, or worked in or integrated into the steering wheel or the steering wheel spoke such that the rotational axis of symmetry extends essentially parallel to the steering wheel surface, and such that less than half of the roller projects beyond the steering wheel surface; i.e. the rotational axis of symmetry is preferably disposed in the interior of the steering wheel, which facilitates the bearing. The pressing direction extends preferably essentially perpendicular to the steering wheel surface. All of the above assists a comfortable "one-finger" operation, particularly by use of one's thumb.

Instead of a roller on the steering wheel, which roller can be rotated and pressed, basically the rotary/pressure actuator normally provided in vehicles of the applicant (or a comparable rotary/pressure actuator) may also be used as the operating device. The operating procedure will then be approximately analogous to the above-described procedure, however, the pressing would take place parallel to the axis of rotation.

Among others, the invention is based on the following considerations.

The use of operating elements at the steering wheel permit an operating input by the driver of a motor vehicle that is relatively free of distractions. However, the operating elements typically provided at a steering wheel are not suitable for a navigation through long lists with a large number of list elements. The use of a head-up display permits a relatively distraction-free information display to the driver of a motor vehicle. The results of operator-ergonomic research indicate, however, that, for reasons of driver distraction, not more than three list entries should be displayed in a head-up display.

Basically, an interaction with lists can take place in a particularly distraction-free manner when operating elements are used on the steering wheel and when a head-up display is used. However, for the above-mentioned reasons, this configuration has the tendency to be more advantageous only for short lists.

A presentation of lists is suggested that extends over several displays. The operation takes place by way of a so-called multifunctional steering wheel or its operating elements and is implemented in two steps. In the first step, a long list is serviced in the instrument cluster or in the central information display (CID). In order to allow a fast navigation through this list by way of the multifunctional steering wheel (MFL), a cursor is used which marks several entries or list elements (for example, two to six, particularly three). At the same moment, these marked entries can also be seen in the head-up display (HUD). It is also contemplated to activate the entries marked in the CID or in the instrument cluster only as a result of the actuation of the multifunctional steering wheel (MFL). In the next step, after the confirmation of the selection in the instrument cluster, a list element can be selected from the comparatively short list in the head-up display (HUD); i.e. the context is displayed in the instrument combination/CID, and the focus of the list is displayed in the head-up display (HUD).

The suggested approach permits a fast controlling of long lists by means of the multifunctional steering wheel (MFL) in the instrument cluster/CID by a "context" cursor. The operation of the context cursor makes low demands on precision and is not susceptible to errors. Only the subsequent operation of a "focus" cursor has higher precision demands. The focus cursor permits a final and targeted navigation of the cursor "in the proximity" of the driving scene.

Other objects, advantages and novel features of the present invention will become apparent from the following detailed description of one or more preferred embodiments when considered in conjunction with the accompanying drawings.

DETAILED DESCRIPTION OF THE DRAWINGS

A motor vehicle has a display 11 in the instrument cluster, which display 11 is used as a first display unit in the sense of the invention. The motor vehicle also has a head-up display 12, which is used as a second display unit in the sense of the invention.

A module 20 having multifunction operating elements is situated on the steering wheel of the motor vehicle. One of the operating elements—operating element 21—is constructed as a rotatable and pressable roller. The operating method for selecting a list element from a list described in the following, from the operator's viewpoint, is carried out exclusively by way of a rotating and pressing of the roller 21.

The starting point is an operating condition, in which the list—in the exemplary embodiment shown, a list of song titles—is called up for presentation on a display 11 (in a manner known per se).

Figure 1:
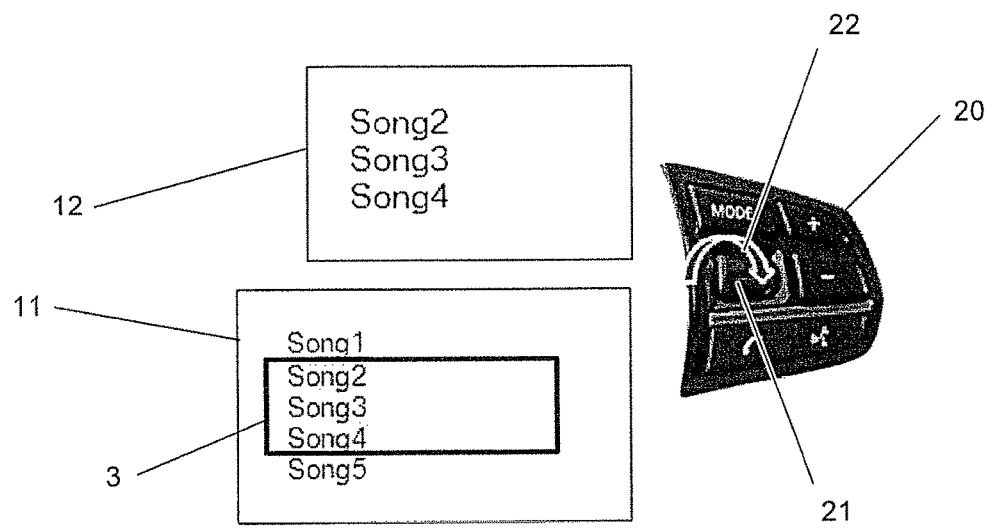
FIG. 1 is a schematic view of a first display unit, a second display unit and a pressure/rotary element during the input of first upward/downward commands.

FIG. 1 illustrates the first display unit 11, the second display unit 12 and the roller 21 during the input of upward/downward commands. For the input of an upward/downward command, the roller 21 is rotated (in a manner known per se) in the upward or downward direction by one rotating step respectively. In FIG. 1, the rotation is outlined by the arrow 22. In the display 11, a preselection frame 3 comprising three list elements respectively is moved corresponding to the upward/downward command: an upward command moves the preselection frame upward by one list element; and a downward command moves the preselection frame downward by one list element. In step with the movement of the preselection frame 3 or in step with the upward/downward command, the three list elements framed by the preselection frame are in each case displayed by the display 12. In the single-screen shot display according to FIG. 1, these are "Song2", "Song3" and "Song4".

Figure 2:
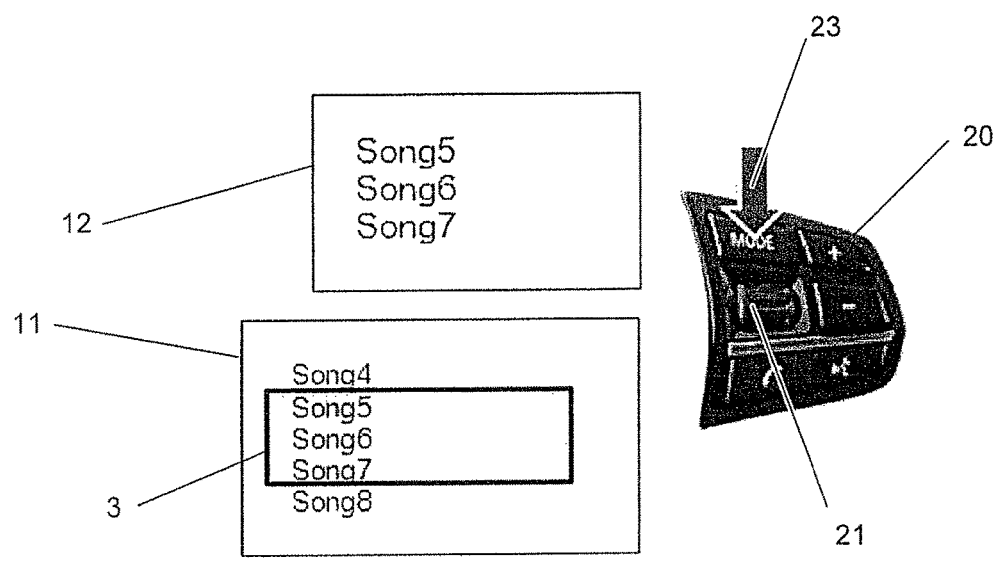
FIG. 2 is a schematic view of the first display unit, the second display unit and the pressure/rotary element during the input of a first selection command.

Three downward commands would then cause the screen-shot display according to FIG. 1 to be changed to the screen-shot display according to FIG. 2. Correspondingly, the preselection frame 3 in the display 11 in FIG. 2 is shifted downward by three list elements within the list, which list in the present example is displayed only partially in display 11 due to its overall length. "Song5", "Song6" and "Song7" are now framed, and these framed list elements are also displayed by display 12. Arrow 23 in FIG. 2 symbolizes the input of a first selection command by pressing the roller 21.

Figure 3:
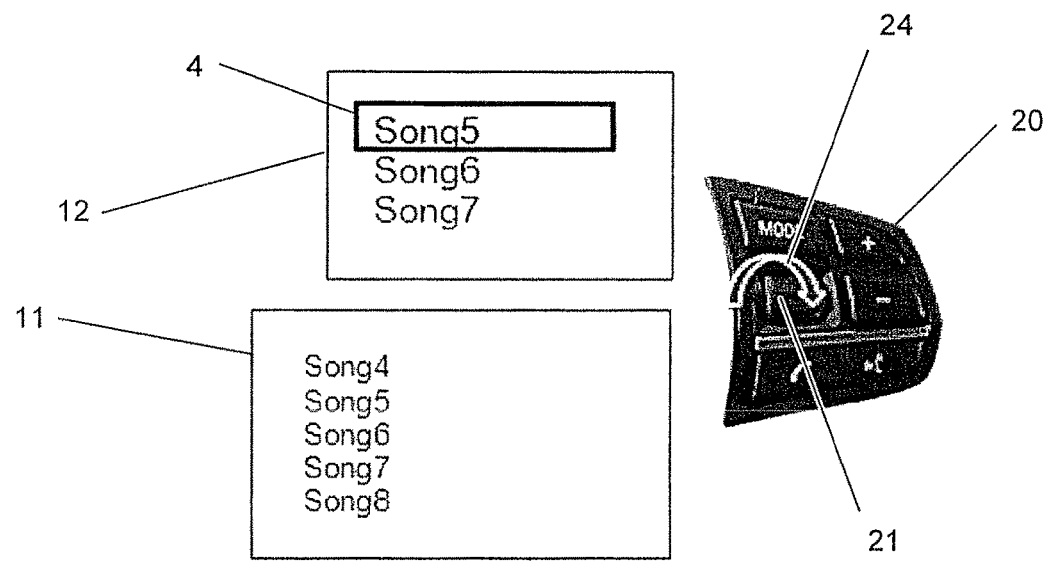
FIG. 3 is a schematic view of the first display unit, the second display unit and the pressure/rotary element during the input of second upward/downward commands.

The input of the first selection command has the result that the first preselection frame 3 disappears in display 11, that the list elements last framed by the preselection frame 12, in a sense, are fixed in display 12, and that a second preselection frame 4 is displayed by display 12 as can be seen in FIG. 3. The preselection frame 4 now extends around precisely one list element (in FIG. 3, this is "Song5") and can again be moved by the input of upward/downward commands. The upward/downward commands for the movement of the second preselection frame 4 are input precisely as was previously done for the upward/downward commands for the movement of the first preselection frame 3 by the operator by rotating the roller 21. In FIG. 3, the rotation is outlined by the arrow 24.

Figure 4:
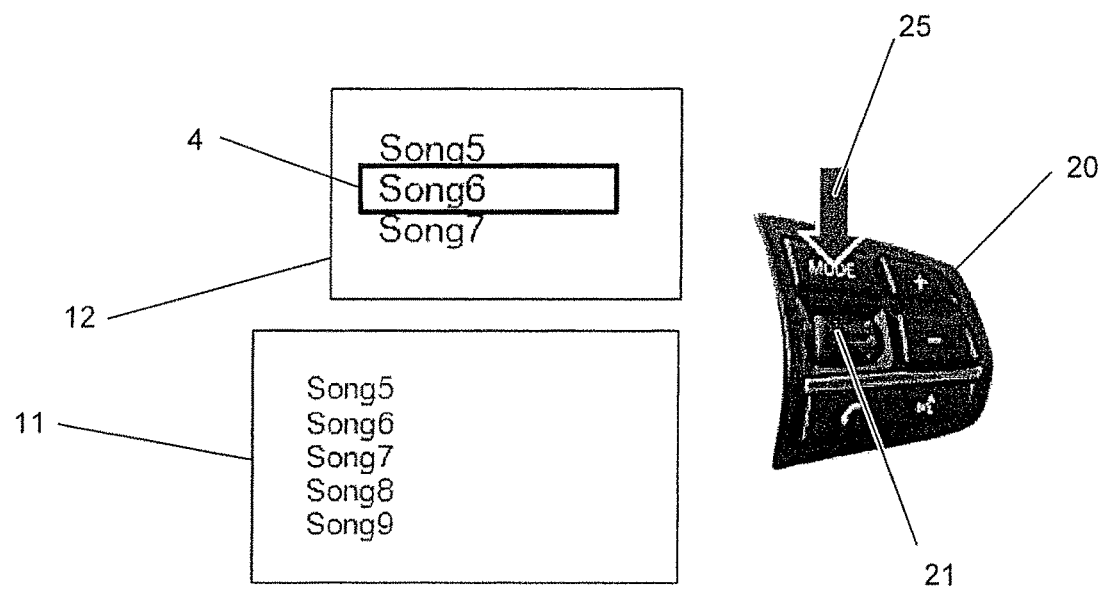
FIG. 4 is a schematic view of the first display unit, the second display unit and the pressure/rotary element during the input of a second selection command.

Exactly one downward command causes the single-screen shot display according to FIG. 3 to change to the screen-shot display according to FIG. 4. Correspondingly, the preselection frame 4 in display 12 in FIG. 4 is shifted downward by one list element within the sublist of display 12. "Song6" is now framed. "Song6" can now be finally selected by another pressing of the roller 21. The arrow 25 in FIG. 4 symbolizes the input of a second selection command by the pressing of the roller 21.

In the present embodiment, the list, or a part thereof, will continue to be displayed in display 11 even after the input of the first selection command and will even still be shifted with the second upward/downward commands. As an alternative, the list can be fixed in display 11 after the input of the first selection command and/or can no longer be displayed.

In the present embodiment, a moving of the first preselection frame 3 within the list in display 11 advantageously takes place by a moving of the list displayed on display 11 (or a rolling change of the displayed list extract) with respect to a preselection frame 3 that is stationary in the display 11. In an intentional contrast thereto, a moving of the second preselection frame 4 within the sublist of display 12 takes place by a moving of the preselection frame 4 with respect to the sublist that is stationary in display 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for selecting a list element from a list comprising a multiplicity of list elements and being displayable at least in an extract form in a motor vehicle, the method comprising the acts of:
    providing first and second visual display units viewable by a driver of the motor vehicle;
    providing an operating device actuatable by the driver of the motor vehicle to generate upward/downward commands and selection commands;
    displaying the list on the first display unit of the motor vehicle;
    moving a first preselection region within the displayed list on the first display unit upwards/downwards in correspondence with first upwards/downwards commands that are received as a result of actuations of the operating device by the driver, the first preselection region highlighting several list elements in the list, wherein the movement of the preselection region upwards/downwards is in single list element increments;
    displaying a sublist exclusively comprising the list elements highlighted by the first preselection region on the second display unit of the motor vehicle upon receiving a first selection command as a result of an actuation of the operating device by the driver;
    moving a second preselection region within the sublist displayed on the second display unit upwards/downwards in correspondence with second upwards/downwards commands received as a result of an actuation of the operating device by the driver, the second preselection region highlighting a single list element of the sublist; and
    selecting the single list element highlighted by the second preselection region upon receiving a second selection command as a result of an actuation of the operating device by the driver.

2. The method according to claim 1, wherein the first preselection region on the first display unit comprises at least one of a frame that highlights several list elements and a color change that highlights several list elements.

3. The method according to claim 2, wherein the second preselection region on the second display unit comprises at least one of a frame that highlights the single list element and a color change that highlights the single list element.

4. The method according to claim 3, wherein the first display unit is a central information display of the motor vehicle or is integrated in an instrument cluster of the motor vehicle, and further wherein the second display unit is a head-up display of the motor vehicle.

5. The method according to claim 1, wherein the second preselection region on the second display unit comprises at least one of a frame that highlights the single list element and a color change that highlights the single list element.

6. The method according to claim 1, wherein the first display unit is a central information display of the motor vehicle or is integrated in an instrument cluster of the motor vehicle, and further wherein the second display unit is a head-up display of the motor vehicle.

7. The method according to claim 1, wherein the displaying of the sublist on the second display unit occurs only after the first selection command is received.

8. The method according to claim 1, further comprising the act of:
    displaying on the second display unit the list elements that are displayed and highlighted on the first display unit via the first preselection region even before the first selection command is received.

9. The method according to claim 1, wherein the first display unit does not display the list until triggered by a first upwards/downwards command.

10. The method according to claim 1, wherein the first upwards/downwards commands are generated by a same operating element of the operating device, and a same actuating method of the operating element, as the second upwards/downwards commands.

11. The method according to claim 10, wherein the first selection command is generated by a same operating element of the operating device, and a same actuating method of the operating element, as the second selection command.

12. The method according to claim 11, wherein the operating device comprises a pressure/rotary operating element, the first upwards/downwards commands and the second upwards/downwards commands being generated by a rotation of the pressure/rotary element, and the first selection command and the second selection command being generated by a pressing of the pressure/rotary element.

13. The method according to claim 1, wherein the first selection command is generated by a same operating element of the operating device, and a same actuating method of the operating element, as the second selection command.

14. The method according to claim 1, wherein the operating device comprises a pressure/rotary operating element, the first upwards/downwards commands and the second upwards/downwards commands being generated by a rotation of the pressure/rotary element, and the first selection command and the second selection command being generated by a pressing of the pressure/rotary element.

15. The method according to claim 14, wherein the pressure/rotary operating element comprises a rotatable and pressable roller operatively configured on a steering wheel of the motor vehicle.

16. A motor vehicle user interface for selecting a list element from a list comprising a multiplicity of list elements, the user interface comprising:

a first display unit arranged in the motor vehicle so as to be viewable by the user of the motor vehicle, wherein at least an extract of the list is displayed on the first display unit;

a second display unit arranged in the motor vehicle so as to be viewable by the user of the motor vehicle, the second display unit displaying only a sublist of the list displayed on the first display unit, wherein:

a first preselection region is identified in the list on the first display unit, the first preselection region highlighting a plurality of list elements of the list and being movable in correspondence with first upwards/downwards commands input by the user, wherein the movement of the preselection region upwards/downwards is in single list element increments, the sublist displayed on the second display unit comprising only the highlighted list elements indicated by the first preselection region, a second preselection region being indicated on the sublist displayed on the second display unit, the second preselection region highlighting a single list element in the sublist and being movable in correspondence with second upwards/downwards commands input by the user.

17. The user interface according to claim 16, further comprising:

an operating device actuatable by the user, the operating device generating the first and second upwards/downwards commands and selection commands with respect to the first and second preselection regions and list elements.

18. The user interface according to claim 16, wherein the first preselection region is identified for the user on the first display unit via a frame around the highlighted list elements and/or via a color change of the highlighted list elements.

* * * * *